June 12, 1956  L. TRIPP  2,750,197
TRAILER WITH ADJUSTABLE REAR WHEELS
FOR TRANSVERSE POSITIONING THEREOF
Filed May 25, 1951  3 Sheets-Sheet 1
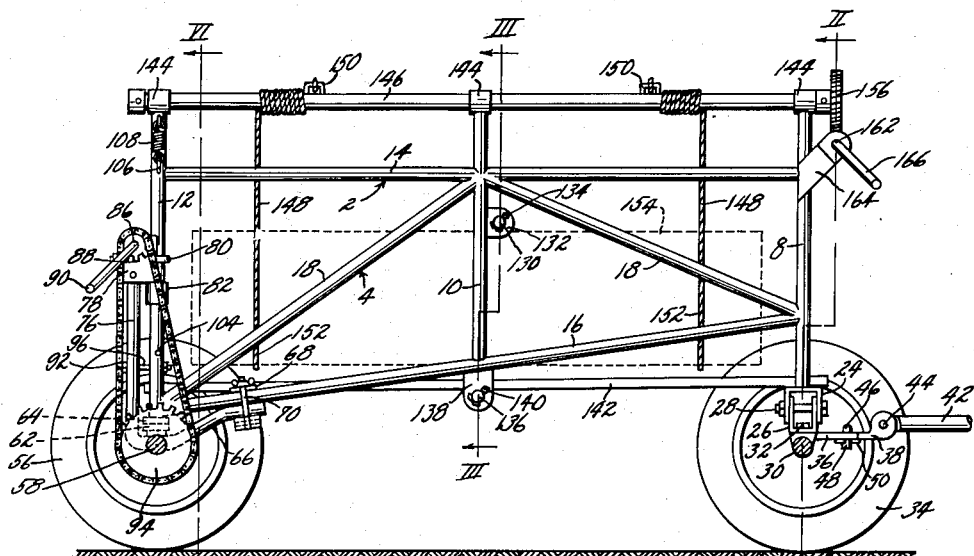
Fig. 1
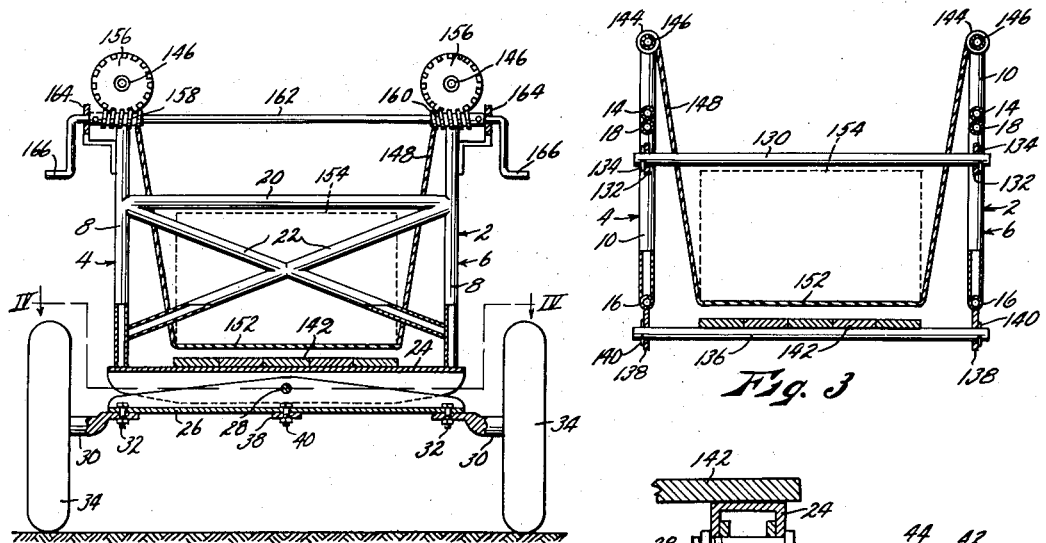
Fig. 2
Fig. 3
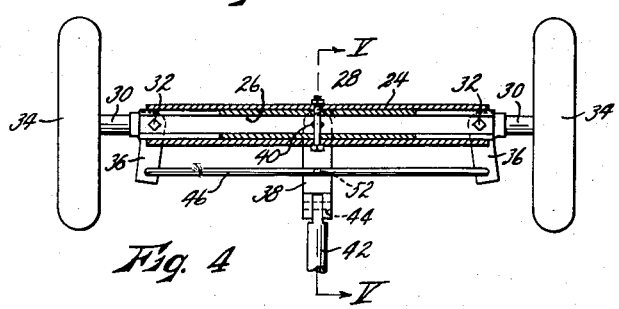
Fig. 4
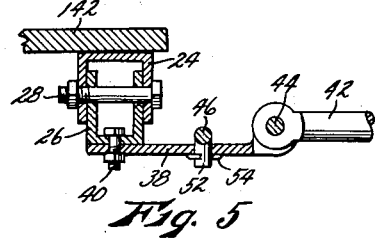
Fig. 5
INVENTOR.
Lue Tripp
BY Hamilton & Hamilton
Attorneys.

June 12, 1956 — L. TRIPP — 2,750,197
TRAILER WITH ADJUSTABLE REAR WHEELS
FOR TRANSVERSE POSITIONING THEREOF
Filed May 25, 1951 — 3 Sheets-Sheet 2

INVENTOR.
Lue Tripp
BY
Hamilton & Hamilton
Attorneys.

INVENTOR.
Lue Tripp
BY
Hamilton & Hamilton
Attorneys.

United States Patent Office 2,750,197
Patented June 12, 1956

2,750,197

TRAILER WITH ADJUSTABLE REAR WHEELS FOR TRANSVERSE POSITIONING THEREOF

Lue Tripp, Kansas City, Mo.

Application May 25, 1951, Serial No. 228,230

3 Claims. (Cl. 280—3)

This invention relates to new and useful improvements in trailer hoists, and relates particularly to a trailer hoist specially adapted to be positioned accurately in a novel manner to permit the object carried thereby to be placed in any desired place.

An important object of my invention is the provision of a trailer hoist having the usual steerable front wheels and having rear wheels which normally trail in the usual manner behind the front wheels, but which may be adjusted so as to permit the rearward end of the trailer to be moved transversely to the normal line of travel of the trailer. This feature is important where for example, the object being carried is a casket or burial vault, and it is desired to position the casket accurately over a grave for lowering thereinto.

Another object is the provision of special means for driving said rear wheels to accomplish said transverse movement.

A further object is the provision of a trailer hoist having a removable load supporting platform and detachable rear and intermediate bolsters for supporting said platform, whereby when said platform and said bolsters are removed said frame is opened at its rearward end and may be positioned directly over the object to be hoisted.

Other objects are simplicity and economy of structure, and ease and convenience of operation.

With these objects in view, as well as other objects which will appear in the course of the specification, reference will be had to the drawing, wherein:

Fig. 1 is a side elevation of a trailer hoist embodying the present invention, showing a load supported thereby in dotted lines, with certain of the wheels thereof broken away.

Fig. 2 is a section taken on line II—II of Fig. 1, with parts left in elevation.

Fig. 3 is a section taken on line III—III of Fig. 1.

Fig. 4 is a fragmentary section taken on line IV—IV of Fig. 2.

Fig. 5 is an enlarged fragmentary section taken on line V—V of Fig. 4.

Figure 6:
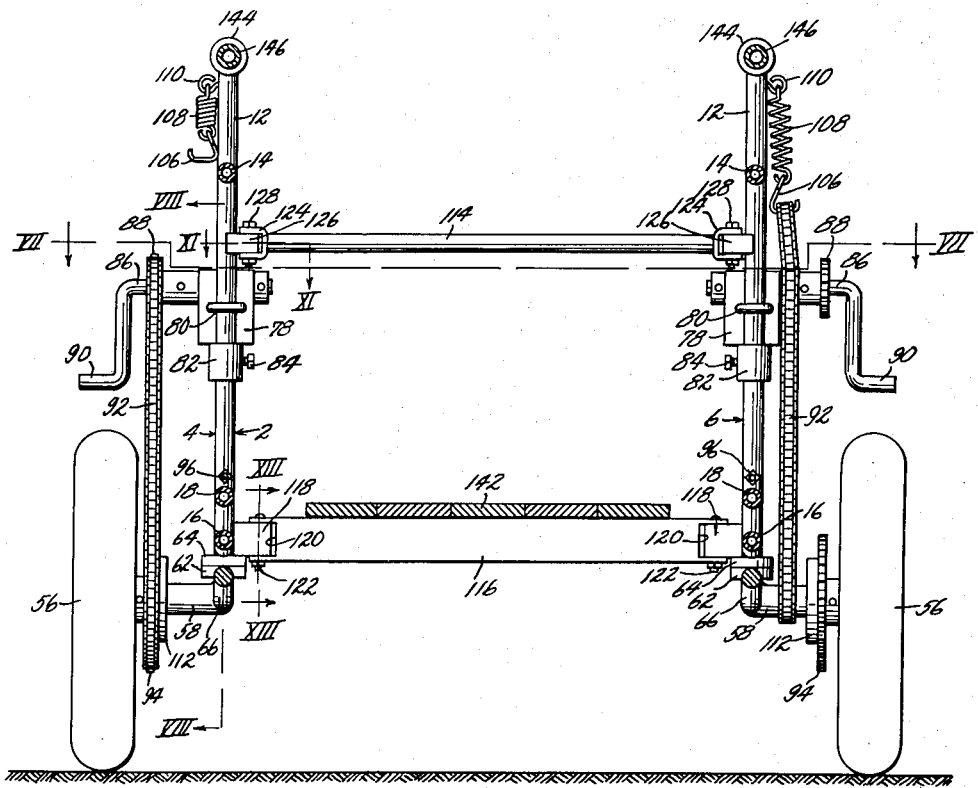
Fig. 6 is an enlarged section taken on line VI—VI of Fig. 1, with parts left in elevation, with one of the rear wheel driving chains shown in its operative position and the other in its inoperative position.

Like numerals apply to similar parts throughout the several views, and the numeral 2 indicates generally a frame formed of tubular members and including parallel, upright side panels 4 and 6. Each of said side panels is substantially planar, and includes a front upright 8, intermediate upright 10, rear upright 12, an upper horizontal member 14, a lower member 16 which is substantially horizontal, and angled brace members 18, all welded or otherwise rigidly joined together. At the forward end of the frame, side frames 4 are rigidly joined by means of an upper horizontal member 20 extending between and welded to front upright frame member 8, and by angled brace members 22, as best shown in Fig. 2. A downwardly opening channel 24 extends horizontally between and is welded to the lower ends of front uprights 8.

An upwardly opening channel 26 substantially coextensive with channel 24 is carried for rocking movement within channel 24, said channels being pivotally joined by a bolt 28 extending horizontally in the longitudinal midline of the trailer. A horizontal, outwardly extending stub axle 30 is pivoted to each end of channel 26 by means of a vertical pivot bolt 32, and a ground-engaging wheel 34 is mounted for rotation on each of said axles. An arm 36 is formed integrally with each of axles 30, and extends forwardly therefrom. A draft link 38 is connected at its rearward end to channel 26 at the midpoint thereof by means of vertical bolt 40, and extends forwardly. A drawbar 42, suitable for connection to a towing vehicle, is connected to the forward end of draft link 38 for vertical swinging movement by pivot pin 44. A connecting bar 46 extends parallel to channel 26, its downturned end portions 48 being pivotally engaged respectively in the forward end portions of arms 36, and secured therein by cotter pins 50, as best shown in Fig. 1. As best shown in Figs. 4 and 5, bar 46 is provided at its midpoint with a downwardly extended stub 52 pivotally engaged in draft link 38 and secured therein by cotter pin 54. Thus drawbar 42, acting through connecting bar 46, arms 36, and axles 30 will turn wheels 34 to cause the trailer to track properly behind the towing vehicle. Arms 36 are normally forwardly divergent as shown in Fig. 4, in order that the wheel 34 on the inside of a turn will turn more sharply than the outside wheel. Arms 36 are extended forwardly in order to prevent any obstruction of the space within frame 2.

Figure 8:
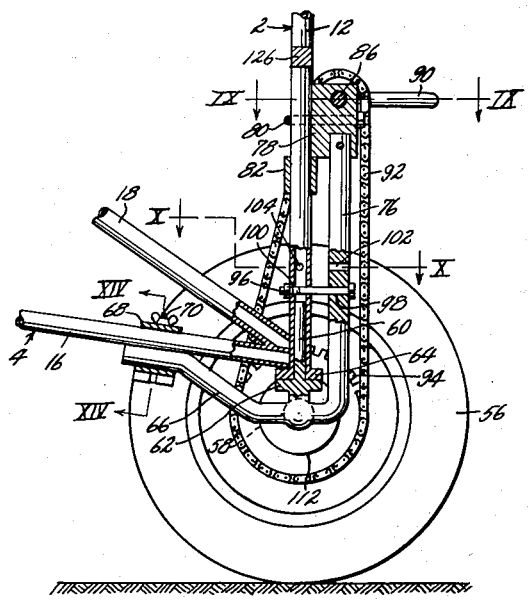
Fig. 8 is a fragmentary section taken on line VIII—VIII of Fig. 6, with parts left in elevation.
Figure 9:
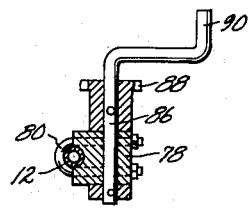
Fig. 9 is a sectional view taken on line IX—IX of Fig. 8, with the driving chain omitted.
Figure 14:
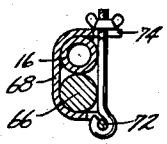
Fig. 14 is an enlarged section taken on line XIV—XIV of Fig. 8.
Figure 13:
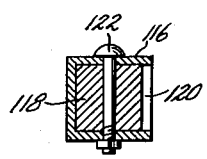
Fig. 13 is an enlarged section taken on line XIII—XIII of Fig. 6.

Each rear wheel 56 of the trailer is carried rotatably on a stub axle 58 which is rigidly joined to a vertical rod 60 which is carried rotatably in the lower portion of the rear upright tubular member 12 of the associated side panel 4 or 6 of the frame 2, as best shown in Fig. 8. Rod 60 has formed thereon an enlarged bearing shoulder 62 which bears rotatably against a matching bearing shoulder 64 fixed to the lower end of frame upright 12. Axles 58 are horizontal and normally disposed at right angles to the line of travel of the trailer. Rigidly attached to each axle 58 is an arm 66 which normally is disposed directly beneath the lower member 16 of the associated side frame 4 or 6. Said arm may be releasably secured to said frame member, thereby securing axle 58 in its normal transverse position, by means of a C-clamp 68 fixed to frame member 16 and adapted to receive arm 66 therein, as best shown in Fig. 14. The open side of said clamp may be closed to retain arm 66 therein by means of a bolt 70 hinged to one end of clamp 68 at 72 and engageable in a notch 74 in the opposite end portion of said clamp.

Figure 7:
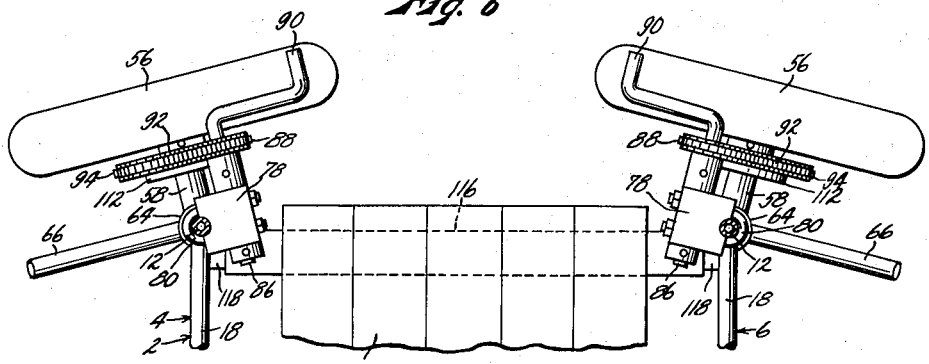
Fig. 7 is a fragmentary section taken on line VII—VII of Fig. 6, showing both driving chains in operative position and showing the rear wheels turned to permit transverse movement of the rearward end of the trailer.

Also rigidly attached to each axle 58 is a rod 76 which extends rearwardly, then upwardly parallel to the associated frame upright 12. Said rod is rigidly attached at its upper end to a block 78, said block being attached to upright 12 for pivotal movement thereon by a U-bolt 80. Said block is prevented from moving downwardly on upright 12 by a collar 82 fixed on said upright by means of set screw 84. Carried for rotation in each of blocks 78 is a shaft 86, said shaft being parallel to the associated axle 58. A pinion 88 is fixed on said shaft, and the outer end portion of said shaft is formed to present a manually operable crank 90. Pinion 88 is operably connected by means of chain 92 with a sprocket wheel 94 fixed to the associated wheel 56 and rotatable with said wheel and axle 58. It is apparent that by loosening C-clamps 68 to free arms 66, wheels 56 can be turned to the position shown in Figs. 7 and 10 to permit movement of the rearward portion of the trailer transversely to the longitudinal midline of the tractor, and that said transverse movement may be effected by turning either or both of cranks 90.

Figure 10:
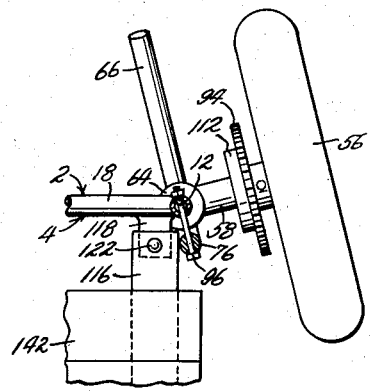
Fig. 10 is a fragmentary section taken on line X—X of Fig. 8, with the rear wheel turned to its position for providing transverse movement of the trailer.
Figure 11:
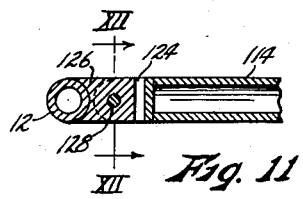
Fig. 11 is an enlarged fragmentary section taken on line XI—XI of Fig. 6.
Figure 12:
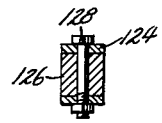
Fig. 12 is a section taken on line XII—XII of Fig. 11.

The rear wheel assemblies may be secured in their transverse positions, or additionally secured in their normal longitudinal positions, by means of bolts 96. Each of said bolts, as best shown in Figs. 8 and 10, may be selectively inserted through a hole 98 formed in rod 76 and a hole 100 formed in frame upright 12 to secure the wheel assembly in its normal position, or through a hole 102 formed in rod 76 and a hole 104 formed in upright 12 to secure the wheel assembly in its transverse position. It will be noted in Fig. 7 that wheels 56 are not turned so that their planes are at right angles to the midline of the trailer, but obliquely thereto. It is preferred that when said wheels are adjusted to provide transverse movement of the trailer, the axes of said rear wheels shall intersect substantially at the midpoint of the front axle of the trailer, since this will permit transverse movement of the trailer with a minimum of wheel slippage on the ground.

During normal transporting of the trailer over a road, it is desired that chains 92 and sprockets 88 be inoperative. For this purpose, chains 92 are left sufficiently loose that they may be forced transversely off of pinions 88 and sprockets 94. As shown at the right hand side in Fig. 6, the upper portion of chain 92 is then engaged in a hook 106 secured to one end of a helical spring 108, the opposite end of said spring being engaged in an eye 110 fixed in the associated frame upright 12. The lower portion of chain 92 passes about axle 58. Sprocket wheels 94 are each provided with a concentric shoulder 112, which prevents any possibility of chains 92 coming into contact with the teeth of said sprockets as said sprockets turn with wheels 56.

At the rearward end of frame 2, side panels 4 and 6 are connected by an upper bolster 114 and a lower bolster 116. Lower bolster 116 is substantially in the form of a box beam, being fitted at its ends over a pair of blocks 118 welded or otherwise rigidly fixed respectively to the inner faces of side panels 4 and 6. The end portions of the inner wall of bolster 116 are cut away as indicated at 120 to permit said bolster to be positioned over said blocks. Each end of the bolster is releasably secured to the associated block 118 by a bolt 122 which passes downwardly through the upper and lower walls of the bolster, and through block 118. Upper bolster 114 is tubular, and has a clevis 124 secured rigidly to each end thereof for attachment to a block 126 welded to the adjacent rear frame upright 12. A bolt 128 is extended downwardly through the arms of clevis 124, and through block 126. Thus it is apparent that bolster 114 may be entirely removed, or if only one of bolts 128 is removed, may be pivoted outwardly to leave the rearward entrance to the frame unobstructed. Since bolsters 114 and 116 are provided with vertically spaced apart members at their ends for receiving the securing bolts, and since said bolts are rigidly secured against rocking by their engagement in the frame blocks, the bolsters are well supported against any appreciable rocking movement, and impart a substantial rigidity to the trailer frame.

At the midpoint of the trailer, frame 2 is provided with an upper bolster 130 extending transversely across the frame and carried slidably in bracket plates 132 welded to intermediate frame uprights 10, and releasably secured in said bracket plates by cotter pins 134. A lower intermediate bolster 136 extends transversely across the frame and has its end portions carried slidably in bracket plates 138 welded to the lower frame members 16 of frame side panels 4 and 6, being releasably secured in said bracket plates by cotter pins 140. Lower bolsters 116 and 136, and channel 24 at the forward end of the frame, lie in a common horizontal plane and are adapted to support a removable flooring 142 which may comprise planks as shown. Upper bolsters 114 and 130, and upper front frame member 20, also lie in a common horizontal plane, and may be utilized to support flooring 142 when desired.

Front upright 8, intermediate upright 10, and rear upright 12 of the side panels 4 and 6 of the frame are extended above upper side frame members 14, and are each provided at their upper end with a tubular bearing member 144. An elongated tubular drum member 146 is disposed in the plane of each side panel 4 and 6, extending the full length of the frame, and carried for rotation in bearing members 144. Two or more cables 148 extend transversely across the frame, having its end portions wound respectively on drums 146 and having its extreme ends engaged in eyes 150 fixed to said drums. Intermediate the two drums 146, cables 148 hang downwardly to form slings 152 for supporting a load 154 indicated in dotted lines. A worm wheel 156 is rigidly secured to the forwardly extended end of each drum 146, said worm wheels meshing respectively with worms 158 and 160 which are fixed on a horizontal shaft 162 carried rotatably in brackets 164 fixed to front frame uprights 8. The outer ends of said shaft are formed to present manually operable cranks 166, whereby drums 146 may be turned. It will be noted that worms 158 and 160, and the worm wheels 156 meshing therewith, are respectively left and right handed, in order that drums 146 will turn in opposite directions.

The operation of the trailer hoist is substantially as follows: to load an object on the trailer, flooring 142 and lower bolsters 116 and 136 are removed. The trailer may then be backed over the object, and the cable slings 152 passed thereunder. If the object is of sufficient height, it may be necessary also to remove upper bolsters 114 and 130. After the trailer is positioned over the object, rear bolsters 114 and 116 are again inserted, in order to prevent the frame from spreading as the object is hoisted. The object is then hoisted by turning either of cranks 166. It will be noted that the worm drive of the drums 146 is self-locking, and requires no dogs, locks, or the like to prevent the weight of the object from turning the drums to unreel the cables. After the object has been hoisted to the height shown in Figs. 2 and 3, lower intermediate bolster may be inserted, and flooring 142 placed as shown, whereupon the object may be lowered to rest on said flooring. If desired, the object may be hoisted above the level of the upper bolster, upper intermediate bolster 130 inserted, and the flooring placed at the higher level. The trailer is then adapted to be transported by a towing vehicle in the usual manner. During said transportation, it is understood that rear wheels 56 are disposed parallel to the longitudinal midline of the trailer, arms 66 being secured in C-clamps 68 and bolts 96 being inserted through holes 98 of rods 76 and holes 100 of frame uprights 12, and that chains 92 are disposed inoperatively as shown at the right side of Fig. 6.

In describing the unloading of an object, it will be assumed that the object is a casket or burial vault, and that it is desired to place said casket in a grave, in order to illustrate one situation in which the transverse adjustability of the trailer may be utilized. In the limited space available for maneuvering a trailer of this type in a cemetery, it is often quite difficult, if not impossible, to line the trailer accurately with a grave, in order that the casket may be lowered directly into the grave. In this event, the trailer is positioned, by means of the towing vehicle, so that the front end of the trailer is properly positioned with respect to the grave, even though the rearward end of the trailer is offset transversely to the grave. Chains 92 are then unhooked from hooks 106, C-clamps 68 are released, and bolts 96 are removed. Rear wheels 56 may then be turned to the position shown in Fig. 7, and bolts 96 reinserted through holes 102 of rods 76 and holes 104 of frame members 12. Thence by turning either or both of cranks 90, wheels 56 may be turned to move the rearward end of the trailer transversely to its midline, and to align the trailer accurately with the grave. The casket is then hoisted above the flooring 142 by turning cranks 166, the flooring and intermediate bolsters 130 and 136 are removed, and the casket lowered into the grave by turning cranks 166 in the opposite direction.

While I have shown and described a specific embodiment of my invention, it is apparent that many minor changes of construction and operation could be made without departing from the spirit of the invention.

What I claim as new and desire to protect by Letters Patent is:

1. A trailer hoist comprising a substantially rectangular frame having tubular upright members at the rearward corners thereof, a pair of steerable front wheels carried rotatably by said frame respectively at the forward corners thereof, a rod pivoted axially in each of said corner frame members, a horizontal stub axle fixed to each of said rods, a wheel carried rotatably on each of said stub axles, a sprocket carried rotatably on each of said axles and fixed to the associated wheel, a block mounted for pivotal movement about a vertical axis on each of said corner frame members and rigidly connected to the associated axle, a shaft carried rotatably in each of said blocks and disposed parallel to said axle, a pinion fixed on said shaft, means operatively interconnecting said pinion and said sprocket, and a crank for turning said shaft.

2. A trailer hoist comprising a substantially rectangular frame having tubular upright members at the rearward corners thereof, a pair of steerable front wheels carried rotatably by said frame respectively at the forward corners thereof, a rod pivoted axially in each of said corner frame members, a horizontal stub axle fixed to each of said rods, a wheel carried rotatably on each of said stub axles, a sprocket carried rotatably on each of said axles and fixed to the associated wheel, a block mounted for pivotal movement about a vertical axis on each of said corner frame members and rigidly connected to the associated axle, a shaft carried rotatably in each of said blocks, and disposed parallel to said axle, a pinion fixed on said shaft, a chain operatively interconnecting said pinion and said sprocket, means for turning said shaft, said chain being disengageable from said pinion and sprocket, and resilient means carried by said frame and adapted to hold said disengaged chain out of contact with the teeth of said sprocket.

3. A trailer hoist comprising a substantially rectangular frame having tubular upright members at the rearward corners thereof, a pair of steerable front wheels carried rotatably by said frame respectively at the forward corners thereof, a rod pivoted axially in each of said corner frame members, a horizontal stub axle fixed to each of said rods, a wheel carried rotatably on each of said stub axles, a sprocket carried rotatably on each of said axles and fixed to the associated wheel, a block mounted for pivotal movement about a vertical axis on each of said corner frame members and rigidly connected to the associated axle, a shaft carried rotatably in each of said blocks and disposed parallel to said axle, a pinion fixed on said shaft, means operatively interconnecting said pinion and said sprocket, a crank for turning said shaft, an arm fixed to each of said axles, means for releasably securing said arm to said frame whereby the associated wheel is fixed in a plane parallel to the longitudinal midline of the frame, and means for selectively securing said axle in a position wherein the extended axis of the associated wheel intersects the midpoint of the axis of said front wheels.

References Cited in the file of this patent

UNITED STATES PATENTS

| | | |
|---|---|---|
| 1,230,131 | Davis | June 19, 1917 |
| 1,545,117 | Baldwin et al. | July 7, 1925 |
| 1,676,381 | Callison | July 10, 1928 |
| 2,055,767 | Jarmin | Sept. 29, 1936 |
| 2,100,971 | McDonald | Nov. 30, 1937 |
| 2,228,247 | Cunningham | Jan. 14, 1941 |
| 2,444,690 | Almendinger et al. | July 6, 1948 |
| 2,448,119 | Peterson | Aug. 31, 1948 |
| 2,472,557 | Wills | June 7, 1949 |
| 2,482,251 | Downing et al. | Sept. 20, 1949 |
| 2,506,860 | Dimon | May 9, 1950 |
| 2,528,672 | Sullivan | Nov. 7, 1950 |

FOREIGN PATENTS

| | | |
|---|---|---|
| 451,813 | Great Britain | Aug. 31, 1935 |